United States Patent [19]

Galen

[11] Patent Number: 4,693,382

[45] Date of Patent: Sep. 15, 1987

[54] SORTER FOR AUTOMOTIVE GLOVE COMPARTMENTS

[76] Inventor: Neal Galen, 2115 W. Royal Palm Rd., Suite 1014, Phoenix, Ariz. 85021

[21] Appl. No.: 892,858

[22] Filed: Aug. 4, 1986

Related U.S. Application Data

[62] Division of Ser. No. 797,930, Nov. 14, 1985.

[51] Int. Cl.$^4$ .............................................. A47F 5/00
[52] U.S. Cl. ................................... 211/189; 211/184; 312/350
[58] Field of Search ................ 211/184, 189, 41, 134, 211/135; 312/350

[56] References Cited

U.S. PATENT DOCUMENTS

| D. 264,894 | 6/1982 | Halder | D6/476 X |
| 2,820,687 | 1/1958 | Waring | 312/350 |
| 3,750,894 | 8/1973 | Jensen et al. | 211/184 |

Primary Examiner—Robert W. Gibson, Jr.
Attorney, Agent, or Firm—Cahill, Sutton & Thomas

[57] ABSTRACT

A sorter, constructed to be placed within any sized and shaped automotive glove compartment, is formed from a lattice like grid having fracturable elements for breaking the grid into each of a plurality of shelves, sides and dividers of predetermined size commensurate with the glove compartment and from a plurality of clips configured to engage and retain the shelves, sides and dividers in rigid relationship to one another.

8 Claims, 9 Drawing Figures

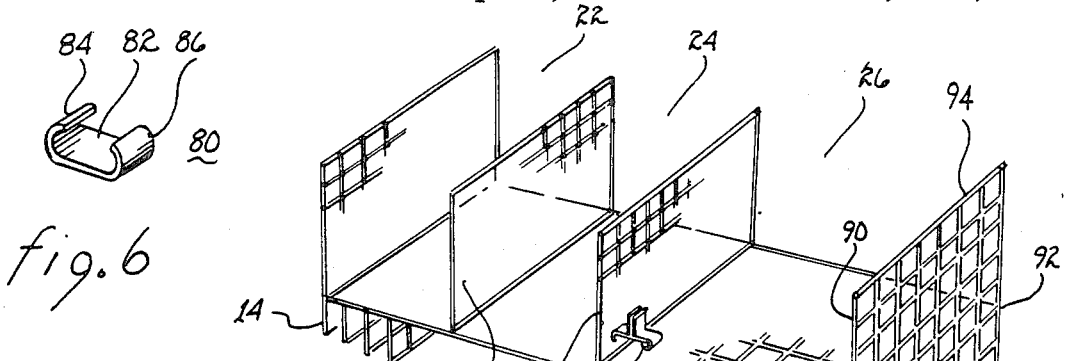
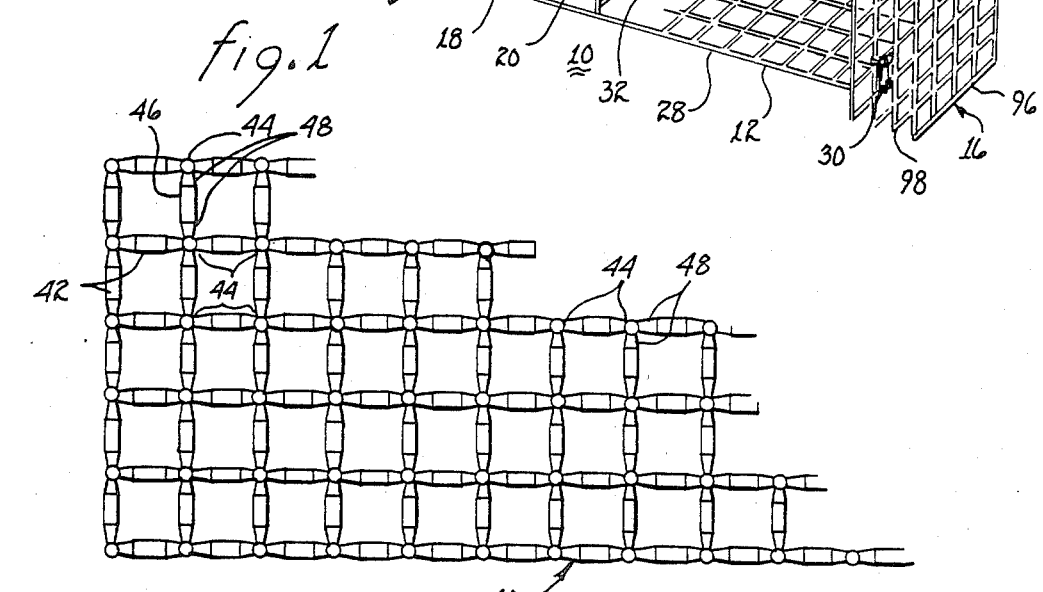
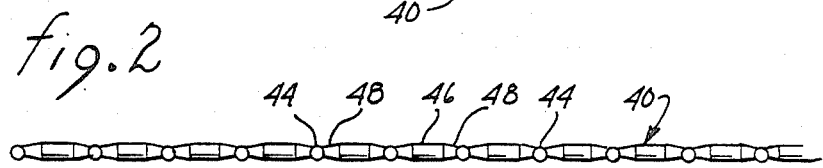
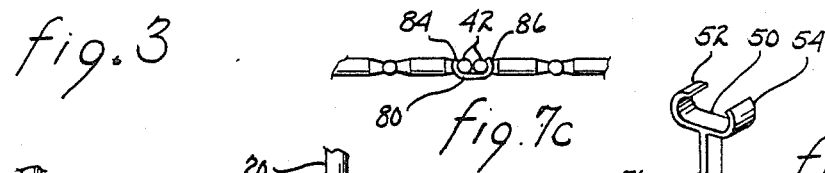
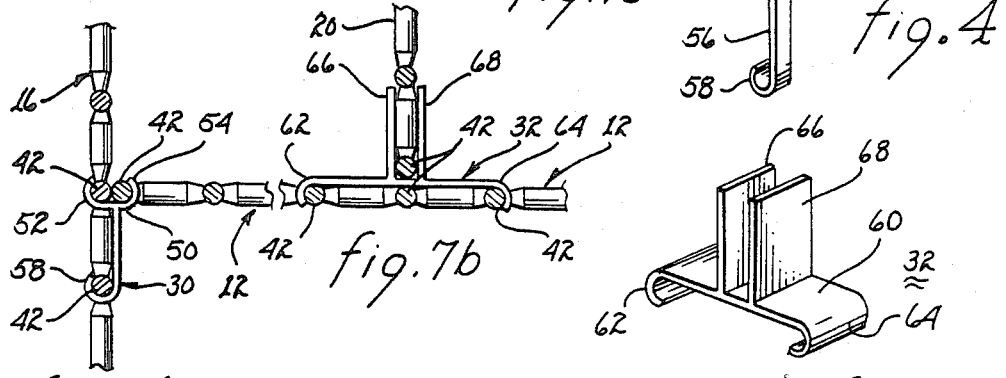

SORTER FOR AUTOMOTIVE GLOVE COMPARTMENTS

This is a division of application Ser. No. 797,930, filed Nov. 14, 1985.

The present invention relates to sorters and, more particularly, to sorters for uniquely shaped compartments.

Glove compartments in automotive vehicles vary greatly in both size and configuration. These variations are primarily due to a combination of factors dictated by considerations other than orderliness of and accessability to the items normally placed within such a glove compartment. Some glove compartments incorporate a relatively horizontal bottom surface while others have a steeply downwardly sloping bottom surface, the latter encouraging the contents of the glove compartment to be piled on top of one another. Because of lateral forces imposed upon the contents of a glove compartment whenever the vehicle turns, sideways motion of the contents and subequent disorganization results. Up to now, a stoic acceptance of this state of the contents of an automotive glove compartment has been the norm.

The problem enumerated above has been known for a period of years and various efforts have been made to organize and retain organized the contents of an automotive glove compartment. The following United States Patents have issued which describe and illustrate the efforts to date to develop structures for organizing automotive glove compartments. U.S. Pat. Nos. 2,820,687 and 4,009,814 are directed to horizontally adjustable shelves secured to the sides or bottom, respectively, of an automotive glove compartment; to be satisfactorily used, the devices disclosed require parallel vertical sides or a horizontal bottom, respectively, of the glove compartment. U.S. Pat. No. D. 264,894 illustrates an automotive glove compartment organizer of fixed height, length and width but wherein vertical partitions for a portion of the organizer may be selectively located. U.S. Pat. No. D. 166,957 illustrates a partitioning device for an automotive glove compartment, which device is of fixed size, fixed vertical partitions and fixed horizontal shelves. U.S. Pat. No. 2,796,310 is directed to a compartmented shelf retractably mounted with the dashboard of a vehicle. U.S. Pat. No. 2,215,208 is directed to a shelf and divider apparatus for use as part of the glove compartment in an automotive vehicle. U.S. Pat. Nos. D. 204,041 and D. 226,892 are directed to displays for merchandise having stackable or positionable shelves, respectively. U.S. Pat. Nos. D. 244,334 and D. 257,417 illustrate compartmented desks. U.S. Pat. Nos. D. 185,138 and D. 2,596,881 illustrate and describe shipping containers. U.S. Pat. No. 3,351,228 illustrates and describes a rigid container having a lattice like bottom.

Each of the devices identified above and related to automobile glove compartments presupposes that such glove compartments are primarily rectangular in plan form and cross section and have horizontal and vertical surfaces. Many automobile glove compartments, particularly the more recent smaller sized automobiles, have glove compartments which conform with criteria established by the configuration of the dashboard, the fire wall and equipment located between the dashboard and the fire wall. Consequently, these glove compartments seldom have only horizontal and vertical surfaces.

It is therefore a primary object of the present to provide a sorter configurable commensurate with any size and shape of cavity.

Another object of the present invention is to provide a sorter configurable commensurate with any size and shape of automobile glove compartment.

Yet another object of the present invention is to provide a sorter for an automobile glove compartment which includes sidewalls and shelves commensurate with particular items to be stored therein.

Still another object of the present invention is to provide a sorter for an automobile glove compartment which can accommodate and compensate for sloping top and bottom surfaces of the glove compartment.

A further object of the present invention is to provide optionally attachable and positionally selective sides and shelves.

A still further object of the present invention is to provide shelves and sides of a lattice like grid and clips usable therewith to secure the shelves and sides to one another.

A yet further object of the present invention is to provide a method for constructing a sorter for an automobile glove compartment.

A yet further object of the present invention is to provide a method for rapidly securing to one another the shelves and sides of a sorter for an automobile glove compartment.

These and other objects of the present invention will become apparent to those skilled in the art as the description thereof proceeds.

The present invention will be described with greater specificity and clarity with reference to the following drawings, in which:

FIG. 1 is a perspective view of a representative sorter for an automobile glove compartment which incorporates the teachings of the present invention;

FIG. 2 is a plan view of a lattice like grid from which are developed the shelves, sides and dividers of the sorter;

FIG. 3 is a side view of the lattice like grid;

FIG. 4 illustrates a J-clip;

FIG. 5 illustrates a T-clip;

FIG. 6 illustrates a C-clip; and

FIGS. 7a, and 7b and 7c illustrate the use of the J-clip, T-clip and C-clip, respectively.

Glove compartments in automobiles and trucks tend to become a depository for all types of items of various configurations. As a result of normal lateral and vertical motions of the vehicle, these items, whether or not placed in an orderly manner in a glove compartment, tend to become mixed with one another with the smaller and heavier items migrating to the lower most point. As many glove compartments in recently manufactured automobiles have a downwardly and forwardly sloping bottom surface, the smaller items tend to become stacked upon one another along the lower most edge and render retrieval of any selected item a matter of pawing about and removal of other items. During such searching, fragile items tend to become damaged and papers tend to become creased or torn. Items often needed in a hurry, such as tissues or maps, may be difficult to locate and upon retrieval cause withdrawal of other items that may end up on the floor of the vehicle. Clearly, apparatus usable in any glove compartment for segregably storing and retaining the items within the glove compartment would be of benefit to the driver and other occupants of the vehicle.

Referring to FIG. 1, there is illustrated a representative configuration of a sorter 10 configured to conform with the unique dimensions of any given glove compartment. The sorter includes a shelf member 12 supported by a pair of side members 14 and 16. A plurality of dividers 18, 20 extend upwardly from shelf member 12 to define three spaces or compartments 22, 24 and 26 between side members 14 and 16. If shelf 12 is located above the bottom edge of side members 14, 16, as illustrated, a further compartment 28 is defined by the shelf member and the portions of the side members extending below the shelf member.

Side member 14, 16 may be secured to shelf 12 by a plurality of J-clips 30 interconnecting the edge of the shelf member with a planar surface defined by the side member. A plurality of T-clips 32 interconnect each of the dividers with the shelf member to both position the divider and provide structural rigidity to the divider.

Referring jointly to FIGS. 2 and 3, there is shown a lattice like grid 40 from which the shelf members, side members and dividers illustrated in FIG. 1 are formed. The grid is formed by rungs 42 extending from juntions 44 with each rung interconnecting adjacent junctions. Each junction has four rungs extending radially therefrom with an angular displacement of 90° between adjacent rungs. Each rung includes a central section 46 of generally uniform cross section. A tapering section 48 extends from each end of the central section to a junction. The purpose for the tapered sections is that of providing and localizing fracture of the rungs in response to a bending load placed thereon essentially at or adjacent the connected junction.

FIG. 4 illustrates J-clip 30. The J-clip serves the purpose of securing an edge of grid 40 to the surface of another grid oriented normal thereto. The J-clip includes a cross member 50 of which curved ends 52, 54 curve toward one another. The spacing between curved ends 52, 54 is essentially commensurate with the dimension of two rungs 42 having their respective central sections 46 placed adjacent one another, as particularly illustrated in FIG. 7a. Moreover, the radius of curvature of the curved ends is essentially commensurate with the radius of the central section of a rung. A tail 56 extends downwardly from approximately the mid point of cross member 50 and is terminated by a further curved end 58. The radius of curvature of curved end 58 is essentially commensurate with the radius of central section 46 of a rung 42. The length of tail 56 is commensurate with the spacing between adjacent parallel rungs in grid 40, as particularly illustrated in FIG. 7a. In this manner, curved end 52 and curved end 58 are capable of engaging and retaining adjacent parallel rungs of grid 40.

FIG. 5 illustrates certain details of T-clip 32. The T-clip includes a base member 60 having opposed downwardly curved ends 62, 64. The radius of curvature of the curved ends is commensurate with central section 46 of a rung. The spacing intermediate curved ends 62, 64 is commensurate with a pair of parallel rungs 42 displaced from one another by an intermediate rung, as illstrated in FIG. 7b. However, it is to be understood that in a modified version or variant of T-clip 32, the spacing intermediate curved ends 62, 64 may be commensurate with the spacing between two parallel adjacent rungs. A pair of supports 66, 68 extend upwardly from approximately the mid point of base member 60. The spacing between the two parallel supports is commensurate with the thickness of grid 40 in order to obtain frictional gripping of a section of grid placed between the supports, as illustrated in FIG. 7a. It is to be understood that the location of support 66, 68 may be at other than the mid point of base member 60.

Referring to FIG. 6, there is shown a C-clip 80. The C-clip includes a base member 82 having opposed curved ends 84, 86. The radius of curvature of each of the curved ends is commensurate with the radius of central section 46 of a rung. The displacement between the curved ends is essentially commensurate with the spacing of two rungs placed adjacent one another, as particularly illustrated in FIG. 7c.

Grid 40, as illustrated, is intended to represent a sheet of a lattice like grid from which the various components of sorter 10 are made and which components are secured to one another by the J-clips, T-clips and C-clips, as necessary. To make sorter 10, the glove compartment into which the sorter is to be placed must be measured with a reasonable degree of accuracy in order to obtain the best fit of the sorter within the glove compartment. Additionally, the size, number and location of any of compartments 22, 24, 26 and 28 to be formed must be determined. With such measurements of height, width and breadth in hand, the dimensions of the various components, such as side members 14 and 16 to be made will be determinable.

Each side member is made by scribing the outline thereof upon grid 40. Such outline may include lateral edges 90, 92, longitudinal edges 94, 96 and diagonal edge 98 (defined by diagonally aligned junctions 44), as illustrated in FIG. 1. To reproduce the outline of a side member from the grid, the grid is bent along commensurate lateral, longitudinal or diagonal lines adjacent junctions 44 interior of the outline scribed. That is, in the event the outline intersects a rung between the junctions interconnected by such rung, the rung is bent with respect to the junction which is interior of the outline. Such bending will tend to fracture the interconnection between the affected rung and its junction at the point where the small end of tapered section 48 joins the junction. Such bending and fracturing can be readily made by gripping the affected rungs and junctions by manually bending them; alternatively, the bending can be accomplished along a straight line by placing the grid along an edge of a hard surface, such as a table edge, and bending the part extending therefrom downwardly to apply a uniform force across a plurality of rungs simultaneously. The remaining components of sorter 10 are similarly fashioned from grid 40.

After all of the components of sorter 10 have been formed from grid 40, they may be attached to one another by use of the respective ones of the J-clips, T-clips and C-clips. To secure shelf member 12 to side member 16, a J-clip 30, as illustrated in FIG. 7a, may be employed. To secure the J-clip, curved ends 52 and 58 are brought into simultaneous engagement with adjacent rungs 42 of side member 16. Thereby, cross member 50 serves in the manner of a platform to receive and support rung 42 at the edge of shelf member 12. Curved member 54 is thus positioned to receive, engage and retain the rung of the shelf member within cross member 50. To prevent disengagement of curved ends 52, 58 due to loads placed on the shelf member, the orientation of one or the other of the curved ends may be reversed to be down opening instead of up opening.

The engagement of T-clip 32 is particularly illustrated in FIG. 7b. Base member 60 rests upon three laterally aligned rungs 42 of shelf member 12. Curved ends 62, 64 engage the respective rungs to lock the T-clip in place. The edge of divider 20 slips in between supports 66, 68 and is supported upon the commensurate segment of base member 60 defined by the supports.

C-clip 80 primarily serves the function of joining the edges of two elements, which elements may be in the same plane, as illustrated in FIG. 7c, or at an angle to one another. Each of curved ends 84, 86 engages a respective rung 42 of the elements to be joined and maintains such engaged rungs adjacent one another.

The grid size and size of the rungs and junctions of lattice like grid 40 may be dimensioned essentially commensurate with the size of the items to be supported and the desired degree of sizing accuracy of the components to be developed therefrom.

It is appreciated that the glove compartment may be used for storing a multitude of items, the nature of which items is primarily a function of the occupants of the vehicle and their needs and habits. As will be appreciated from the above discussion, sorter 10 to be developed can be of a configuration specifically and uniquely adapted to meet the needs for storing in an organized manner any shaped and number of items commensurate with the volume and shape as dictated by the glove compartment itself.

While the principles of the invention have now been made clear in an illustrative embodiment, there will be immediately obvious to those skilled in the art many modifications of structure, arrangement, proportions, elements, materials, and components, used in the practice of the invention which are particularly adapted for specific environments and operating requirements without departing from those principles.

I claim:

1. A sorter for an automotive glove compartment, said sorter comprising in combination:
   (a) at least one shelf member for supporting articles to be stored in the glove compartment;
   (b) side members for supporting said shelf member within the glove compartment;
   (c) each said shelf member and said side member being formed from a lattice like grid, said grid including rungs and junctions and wherein each said rung interconnects a pair of said junctions and wherein each said rung includes opposed tapered sections tapering toward a connected one of said junctions for defining the point of fracture of said rung adjacent each connected one of said junctions;
   (d) means for detachably attaching said side members to said shelf member;
   (e) at least one divider for segregating articles to be stored upon said shelf member; and
   (f) further means for detachably attaching said divider to said shelf member.

2. A sorter for an automotive glove compartment, said sorter comprising in combination:
   (a) at least one shelf member for supporting articles to be stored in the glove compartment;
   (b) side members for supporting said shelf member within the glove compartment;
   (c) each said shelf member and said side member being formed from a lattice like grid, said grid including rungs and junctions and wherein each said rung interconnects a pair of said junctions and wherein each said rung includes means for localizing fracturing of said rung adjacent at least one of said junctions interconnected by said rung;
   (d) means for detachably attaching said side members to said shelf member;
   (e) at least one divider for segregating articles to be stored upon said shelf member; and
   (f) further means for detachably attaching said divider to said shelf member.

3. A sorter for an automotive glove compartment, said sorter comprising in combination:
   (a) at least one shelf member for supporting articles to be stored in the glove compartment;
   (b) side members for supporting said shelf member withing the glove compartment;
   (C) each said shelf member and said side member being formed from a lattice like grid, said grid including rungs and junctions and wherein each said rung interconnects a pair of said junctions;
   (d) means for detachably attaching said side members to said shelf member said detachably attaching means including a J-clip for engaging at least one rung of said shelf member with at least one rung of one of said side members, each said J-clip having a cross member terminated by upwardly curved ends curved toward each other and spaced apart from one another by a distance equivalent to the distance between a pair of adjacent ones of said rungs and a tail extending from said cross member and terminated by a curved end curved toward said cross member and spaced from said cross member a distance equivalent to the distance between a pair of adjacent ones of said rungs;
   (e) at least one divider for segregating articles to be stored upon said shelf members; and
   (f) further means for detachably attaching said divider to said shelf member.

4. A sorter for an automotive glove compartment, said sorter comprising in combination:
   (a) at least one shelf member for supporting articles to be stored in the glove compartment;
   (b) side members for supporting said shelf member within the glove compartment;
   (c) each said shelf member and said side member being formed from a lattice like grid, said grid including rungs and junctions and wherein each said rung interconnects a pair of said junctions;
   (d) means for detachably attaching said side members to said shelf member;
   (e) at least one divider for segregating articles to be stored upon said shelf member; and
   (f) further means for detachably attaching said divider to said shelf member said further detachably attaching means including a T-clip for clip for engaging at least one rung of said shelf member and for receiving at least one of said dividers, each said T-clip having a base member terminated by downwardly curved ends curved toward each other and spaced apart from one another by a distance equivalent to the distance which is a function of the space between a pair of adjacent ones of said rungs and a pair of parallel supports extending upwardly from the said base member and spaced apart from one another by a distance equivalent to the thickness of said grid.

5. The sorter as set forth in claim 4 wherein said detachably attaching means includes a J-clip for engaging at least one rung of said shelf member with at least one rung of one of said side members.

6. A sorter for placement within a compartment, said sorter comprising in combination:
   (a) at least one shelf member for supporting articles to be stored in the compartment, said shelf member having a boundary configuration generally representative of a horizontal cross section of the compartment;
   (b) a pair of side members for supporting said shelf member within the compartment, each of said side members having a boundary configuration generally representative of the respective vertical cross sections of the compartment;
   (c) each said shelf member and each of said side member being formed from a lattice like grid, said grid including rungs and junctions and wherein each said rung interconnects a pair of said junctions and wherein each said rung includes opposed tapered sections tapering toward a respective one of said junctions for defining points of fracture of said rung adjacent a connected one of said junctions; and
   (d) means for detachably attaching each of said side members to said shelf member.

7. A sorter for placement within a compartment, said sorter comprising in combination;
   (a) at least one shelf member for supporting articles to be stored in the compartment, said shelf member having a boundary configuration generally representative of a horizontal crss section of the compartment;
   (b) a pair of side members for supporting said shelf member within the compartment, each of said side members having a boundary configuration generally representative of the respective vertical cross sections of the compartment;
   (c) each said shelf member and said side member being formed from a lattice like grid, said grid including rungs and junctions and wherein each said rung interconnects a pair of said junctions and wherein each said rung includes means for localizing fracturing of said rung adjacent at least one of said junctions interconnected by said rung; and
   (d) means for detachably attaching each of said side members to said shelf member.

8. A sorter for placement within a compartment, said sorter comprising in combination:
   (a) at least one shelf member for supporting articles to be stored in the compartment, said shelf member having a boundary configuration generally representative of a horizontal cross section of the compartment;
   (b) a pair of side members for supporting said shelf member within the compartment, each of said side members having a boundary configuration generally representative of the respective vertical cross sections of the compartment;
   (c) each said shelf member and said side member being formed from a lattice like grid, said grid including rungs and junctions and wherein each said rung interconnects a pair of said junctions; and
   (d) means for detachably attaching each of said side members to said shelf member said detachably attaching means including a J-clip for engaging at least one rung of said shelf member with at least one rung of one of said side members, said J-clip having a cross member terminated by curved ends curved upwardly toward each other and spaced apart form one another by a distance equivalent to the distance between a pair of adjacent ones of said rungs and a tail extending from said cross member and terminated by a curved end curved toward said cross member and spaced from said cross member a distance equivalent to the distance between a pair of adjacent ones of said rungs.

* * * * *